United States Patent [19]
Dawson

[11] 3,781,790
[45] Dec. 25, 1973

[54] SIGNAL LIGHT FOR EMERGENCY VEHICLE

[76] Inventor: Peter G. Dawson, 22 Lakeview Ave., Lakewood, N.Y. 14750

[22] Filed: Jan. 28, 1972

[21] Appl. No.: 221,512

[52] U.S. Cl. ................................. 340/97, 240/57
[51] Int. Cl. ............................................ B60q 1/52
[58] Field of Search ................ 108/44, 46; 240/7.1, 240/8.18, 8.2, 8.22, 52.1, 57; 248/208, 226 E; 340/84, 87, 97, 119

[56] References Cited
UNITED STATES PATENTS

| | | | |
|---|---|---|---|
| 918,415 | 4/1909 | Berger | 248/247 |
| 1,756,942 | 5/1930 | Eddy et al. | 240/52.1 X |
| 2,445,606 | 7/1948 | Davis | 248/226 E |
| 2,474,513 | 6/1949 | Behrens | 248/208 X |
| 2,657,379 | 10/1953 | Zappia | 248/208 X |
| 2,728,847 | 12/1955 | Stoker et al. | 240/7.1 R X |
| 3,351,904 | 11/1967 | Noruk | 340/97 |

FOREIGN PATENTS OR APPLICATIONS

| | | | |
|---|---|---|---|
| 237,729 | 1/1965 | Austria | 240/52.1 |
| 486,331 | 6/1938 | Great Britain | 240/8.2 |
| 511,227 | 8/1939 | Great Britain | 240/7.1 R |

Primary Examiner—Kenneth N. Leimer
Attorney—Charles L. Lovercheck

[57] ABSTRACT

A signal light for an emergency vehicle. The light is supported on a horizontal part of a bracket which clamps onto the window of the vehicle. The bracket is made of a flat piece of resilient material, such as steel or relatively rigid plastic. It has a horizontal platform that supports the light and the material from the platform is bent downwardly and then bent back on itself upwardly then downwardly forming a space to receive the auto glass. A brace supports the platform to the vertically extending part of the bracket. Thus the bracket can be slipped over the window glass of an automobile when the window is lowered. The window can then be raised and the bracket will be held snugly against the window and the window frame.

1 Claim, 1 Drawing Figure

PATENTED DEC 25 1973　　　　　　　　　　　3,781,790
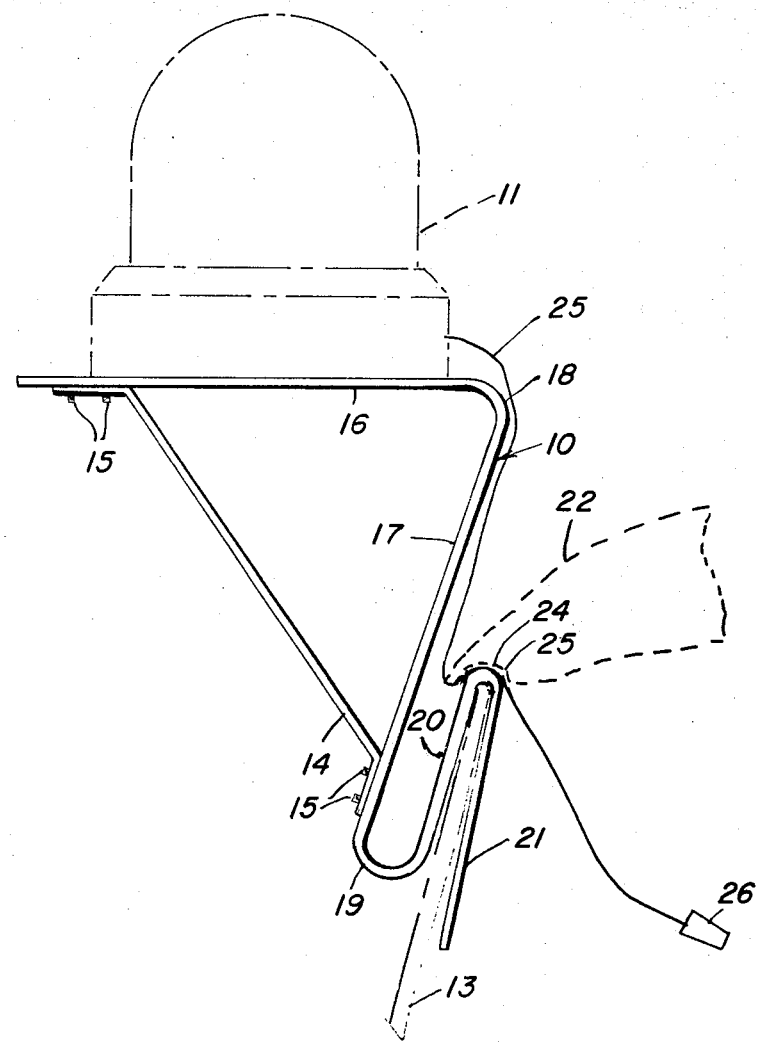

SIGNAL LIGHT FOR EMERGENCY VEHICLE

GENERAL STATEMENT OF INVENTION

It is frequently desirable to have a removable emergency light such as a blinker light that can be removed from the vehicle or installed in a short time. These types of lights are suitable for use by volunteer firemen and the like, who use their personal automobile in their duties in connection with fires and they also use it for other purposes. The light disclosed herein can be readily installed and removed from the private automobile and when installed, it is supported rigidly and effectively above the level of the top of the vehicle.

REFERENCE TO PRIOR ART

The light disclosed herein is of the general class of that shown in U.S. Pat. No. 3,434,108 and U.S. Pat. No. 2,922,152 and constitutes an improvement over these devices.

OBJECTS OF THE INVENTION

It is, accordingly, an object of the invention to provide an improved vehicle light.

Another object of the invention is to provide a vehicle light which is simple in construction, economical to manufacture, and simple and efficient to use.

Another object of the invention is to provide an improved emergency light for a vehicle.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

DESCRIPTION OF THE DRAWING

The drawing shows a light viewed from the rear according to the invention.

DETAILED DESCRIPTION OF THE DRAWING

The light shown herein may be used by a policeman or fireman of other person requiring a signal. It can also be used for ambulances, airport crash wagons, or the like. The light is indicated generally at 11 supported on a bracket 10. The support bracket 10 has a platform portion 16 that is adapted to be supported generally horizontally when in use and the light 11 is supported on the platform 16 by conventional means.

The horizontal portion 16 is integrally attached to the vertical portion 17 and the horizontal portion 16 and vertical portion 17 are bent relative to each other at 18 and held rigidly by brace 14 which is riveted to the member 17 and member 16 by rivets 15.

The bracket member is bent back on itself at 19 so that the glass engaging portion 20 extends generally parallel to the vertical part 17. The bracket is then bent again at 24 to form the inside of the glass engaging member 21.

The sides of the members 20 and 21 adjacent each other can be lined with felt or sponge rubber or the like so that they will not damage the glass. When the members 20 and 21 are supported over the glass 13 and the window is raised, the bracket end will engage the closure 24 of the top of the vehicle 22. Thus an electrical cord 25 may be connected to the light, extended through the space between the end and the vehicle 24 and the end 26 may be plugged into a lighter plug in the vehicle to illuminate the lamp 11. The bracket may be made of steel 6 inches wide and about one-sixteenth inch thick, for example.

The foregoing specification sets forth the invention in its preferred practical forms but the structure shown is capable of modification within a range of equivalents without departing from the invention which is to be understood is broadly novel as is commensurate with the appended claims.

I claim:

1. In combination, a vehicle, a bracket, and a light, said light being a beacon type signal light,
said bracket being made of a continuous piece of material having a light supporting platform part adapted to be disposed generally horizontally and having the light supported on its upper side,
said continuous piece of material being bent generally at right angles to said supporting part and extending downwardly forming a vertical part, then bent upwardly and forming a first glass engaging part, then bent downwardly generally parallel to said first glass engaging part and forming a second glass engaging part and defining a space to receive a vehicle window between said first glass engaging part and said second glass engaging part,
said vehicle having an upwardly moving window,
said bracket being supported on said window with said window holding said bracket in place,
and a brace fixed to said vertical part adjacent the lower end thereof and extending upwardly and from said vertical part and attached to said supporting part whereby said brace is held relatively rigidly to the lower end of said vertical part.

* * * * *